July 9, 1929.  R. F. HALL  1,720,598
GLASSWARE MACHINERY
Filed Dec. 16, 1924  4 Sheets-Sheet 1

INVENTOR:
ROBERT FREDERICK HALL,
By his Attorneys,

July 9, 1929.  R. F. HALL  1,720,598
GLASSWARE MACHINERY
Filed Dec. 16, 1924   4 Sheets-Sheet 4

INVENTOR:
ROBERT FREDERICK HALL,
By his Attorneys,

Patented July 9, 1929.

1,720,598

UNITED STATES PATENT OFFICE.

ROBERT FREDERICK HALL, OF WYTHALL, NEAR BIRMINGHAM, ENGLAND.

GLASSWARE MACHINERY.

Application filed December 16, 1924, Serial No. 756,228, and in Great Britain December 21, 1923.

This invention refers to machinery for the manufacture of glassware, and relates to that type of machinery in which a flow of feed system is provided for delivering separate charges or "gobs" of glass to the parison or equivalent or other required moulds of the machine.

The present machine is also of the so called "turnover type", in which the molten glass is supplied to an upturned or inverted parison mould, co-operating with a neck mould or its equivalent, the parison and neck moulds, after the glass has been received therein, being turned through two right angles or inverted, so that the parison mould comes beneath the neck mould, after which the parison mould is opened and replaced by a blowing or finishing mould, in which the blowing or finishing of the bottle or other glass article being manufactured takes place.

A primary object of the present invention is to provide a rotary machine of the foregoing type, which is preferably rotated continuously but which may be rotated step by step such machine including a central stationary column, a table rotatable about such column, the said table having mounted thereon a plurality of mechanisms for making bottles or the like, such mechanisms being arranged radially and each including a casing or casting which carries a divided finishing mould and operating parts thereof, an inner element rotatable therein and carrying a head, divided neck mould, divided parison mould or equivalent parts and mechanisms for operating the same, together with means, after the parison mould has been charged, inverted and opened for drawing the halves of such mould radially inwards towards the central standard of the machine, so that the halves of the finishing mould can be conveniently closed, without interference from the halves of the parison moulds.

A further object of the invention is to provide means for enabling a preliminary blowing to be given to the parison, whilst still contained in the parison mould, preferably during the turnover movement and before the opening of such mould.

A further object of the invention is to provide improved means for applying suction or vacuum and for supplying air under pressure for cooling or blowing purposes to the various radially arranged mechanisms.

Another object of the invention is to provide improved means for preventing the bottles or other articles in the process of manufacture from sticking to the halves of the finishing mould when this latter is opened, and for delivering the finished articles.

A further object of the invention is to provide improved means for driving the rotary table from the central fixed column of the machine.

Other objects of the invention will be described and explained more fully in the course of the following description.

In order that the invention may be more clearly understood, it will now be described with reference to the accompanying drawings, which illustrate by way of example one application of its principles, the constructions shown being more particularly those adapted for the manufacture of glass bottles.

The same letters and numerals of reference are employed to denote similar parts in all the views.

*a* is the central column of the machine, which is mounted in the ordinary way upon a wheeled trolley or base, not shown upon the drawings. This column *a* carries the means for supporting and driving the rotary table, the distributing means for suction and air, the fixed cams and other like parts. *b* is a circular channeled member constituting an oil bath. *c* is a rotary table or platform formed with a bearing *d* engaging in the before-mentioned channel *b*. The portion *b* is provided with an internally toothed annulus *e*. *f* is a shaft passing through a bearing bracket *g*, near the top of the column *a*, and engaging at the bottom in a footstep bearing *h* formed in the main casting of the column. *k* is a pinion, keyed to the shaft *f* and meshing with the annulus *e*. The shaft *f* is driven from a motor *m* by a worm wheel drive *n*.

Mounted at equal angular distances apart on the table *c* are the castings forming the body of the unit, one of which is shown *p*. Each of these units is attached by means of feet *q* (Fig. 5) to the surface of the table *c*, by bolts or the like.

The casting *p* has formed therewith or attached thereto, a trunnion *s*, which extends down to the table *c* and forms the fixed pivotal bearing for the arms *t* carrying the halves of the finishing mould.

The casting *p* is provided with a horizontal boring, within which is mounted a sleeve *u*. This sleeve is rotatable in the said casting *p*, but cannot move longitudinally therein. *v* is a toothed wheel mounted on the sleeve *u* at the inner end thereof and meshing with an interrupted circular rack *w* carried by a fixed support 2 attached to the central column *a*.

3 is another sleeve, within the sleeve *u* and constrained to rotate therewith, in the manner hereinafter described. The sleeve 3 is provided with forward extensions 4 and 5 carrying the pivots 6 for the halves 7 of the parison mould. These halves 7 are provided with lugs 8, connected by means of links 9 to a plunger 10, slidable within the sleeve 3. The plunger 10 is carried by a rod 11 provided with a cam roller 12 working in the fixed grooved cam carried by the stationary column *a*. The connection of the rod 11 to the plunger 10 includes a rotary joint 13 permitting the plunger to rotate with the sleeve 3 without rotating the rod 11.

Figure 7:
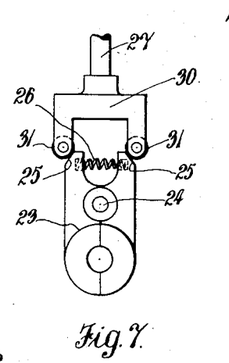
Figs. 7 and 8 are plans of the ring or neck mould and operating mechanisms therefor, in two different positions.
Figure 8:
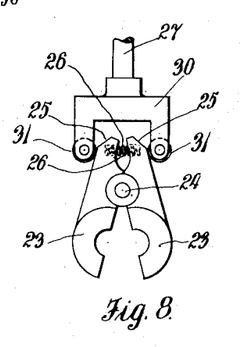

14 is an arm carried by a bearing 15 on the sleeve *u*. This arm has mounted at its outer extremity, and in a springy manner, a cover 16, adapted to close the bottom of the parison mould, at the required time. The arm 14 is adapted to be rocked by means of a pinion engaging with a longitudinally sliding rack 17, working in a slot or guide in the sleeve *u*, and controlled by a lever 18 fulcrumed at 19 in a bracket carried by the gear wheel *v*. The operation of the lever is effected from a rod 19 provided with a cam roller 20 working in a fixed grooved cam attached to the vertical column *a*. The connection between the rod 19 and the lever 18 includes a joint allowing for the circular motion of the sleeve *u* and consequently of the lever 18, which, if desired, may be forked. 21 is an extension carried by the sleeve *u* and itself carrying the blowing head 22. The halves 23 of the ring or neck mould are pivoted at 24 and are extended rearwardly, such extended portions being bevelled at the outer ends at 25. 26 is a compression spring tending to keep the halves of the mould closed. 27 is a rod controlled by a cam 28 on the central column, and kept pressed into contact with the said cam by a spring 29. The outer end of this rod is forked at 30 and each of the arms thereof is provided with a roller 31 co-operating with the beveled surface 25 of the corresponding extension, as seen at Figs. 7 and 8. The fork works in a guide way in an upper extension 32 of the casing *p*. 33 is an annular channel in the face of the casting *p* with which communicates a passage 34 passing through the trunnion *s*.

35 is a passage in the rotary sleeve *u*, adapted to co-incide in all positions of the said sleeve with the channel 33. The passage 35 opens into a valve chamber carrying a spring loaded valve 36, on the other side of which is a passage 37 leading to the blowing head 22. The valve rod is extended through to the outside, and is adapted to be operated by a bent lever 38 carrying a roller 39. This roller 39 is adapted to be operated by adjustable cam pieces 40, carried by the casting *p* (see Fig. 6). It is also adapted to be operated by the spring pressed cam actuated rod 41.

42 is a pipe connected at one end to the air passage in the trunnion *s* and at the other end to a rotatable ring 43 encircling the fixed standard and retained in position by a spring pressed ball race 44. This spring pressed ball race secures an air-tight joint between the upper surface of the rotary ring 43 and the lower surface of a step 45 on the fixed standard *a*. This step 45 is shown diagrammatically at Fig. 9. It comprises a stationary vacuum chamber 46, in connection by means of a pipe 47, with a source of suction. It also comprises another chamber 48 in connection with a supply of blowing air through a pipe 49.

It is to be clearly understood, that the ring 43 is provided with a pipe 42 for each unit, each of which pipes communicates with an aperture 50 by means of which it can be put into communication, during the rotation of the ring 43, either with the chamber 46, or with the chamber 48, depending upon its position.

Figure 9:
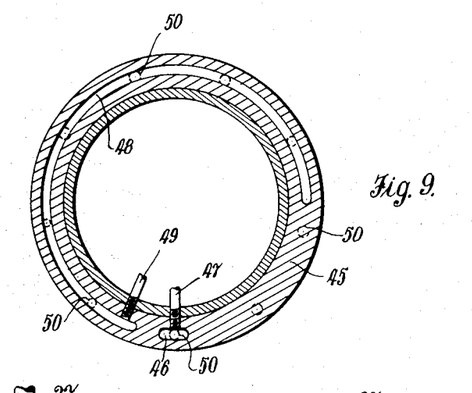
Fig. 9 is a diagrammatic plan illustrating the distributing system for vacuum and air.

When the aperture 50 of any one of these comes opposite the vacuum chamber 46, as shown in the lower portion of Fig. 9, the suction acting through the pipe 42, the passage 34, the passage 35, to the valve chamber, causes the valve to be raised from its seating, against the pressure of the spring, causing suction to be produced in the head through the passage 37, for the purpose hereinafter explained. On the other hand, when one of the apertures 50 is in communication with the chamber 48, the blowing air is supplied through the pipe 42 and the passage 34 to the annular groove 33, and through the passage 35 from the annular groove 33 to the valve chamber; but it cannot proceed further except when the valve 36 is raised from its seating either by the sectional cam 40, or by the cam operated rod 41, in which cases blowing air passes to the head 22.

Figure 3:
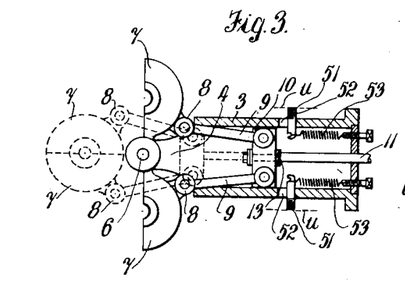
Figs. 3 and 4 show diagrammatic plans of the halves of the parison moulds and their operating mechanism in various positions.
Figure 4:
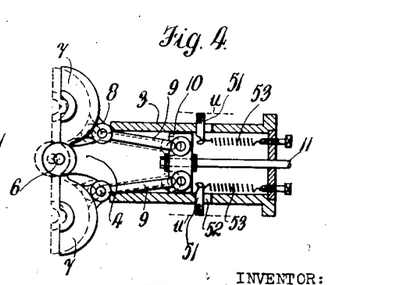

The inner sleeve 3 is connected to the outer sleeve $u$ by means of pins 51 screwing into the outer sleeve $u$ and engaging in longitudinally extending short slots 52, in the inner sleeve 3, as seen at Figs. 3 and 4. This constitutes the inner and outer sleeves into a combined member as they are constrained to rotate together, whilst allowing for a longitudinal movement between the sleeves, the inner sleeve being able to slide within the outer sleeve. 53 are tension springs connected at one end to the pins 51 and at the other end to adjustable screws carried by an end plate on the cylinder 3.

In order to lock the rotatable sleeves with the head and associated parts either in the upright or in the inverted position, the following mechanism is provided:—

The casting $p$ has located in a boring therein, a spring controlled bolt 54, adapted to spring into one of two holes located 180° apart in the outer sleeve $u$. The stem of the bolt is under the action of a lever 55, the end of which carries a roller 56 coming on the underside of the interrupted circular track, and influenced by the cam thereon. It is to be pointed out that the locking device is, for the sake of convenience, shown in Fig. 1 in the plane of section, but that in practice, in order to prevent interference with other mechanisms it would be located at an angular distance of about 20° from such plane with respect to the axis of the sleeves.

Referring to the operating mechanism for the finishing mould halves, the arms $t$ are connected to the toggle links 57 attached to a cam slide 58 provided with a roller 59 working in a grooved cam fixed to the central column $a$. The arms $t$ carry at their extremities pivots 60 upon which are mounted the halves 61 of the finishing moulds (see Fig. 5). The pivots 60 carry pinions 62, against which racks 63 are kept pressed by suitable means, the racks being pivotally mounted at 64 upon the table $c$.

Figures 2, 5:
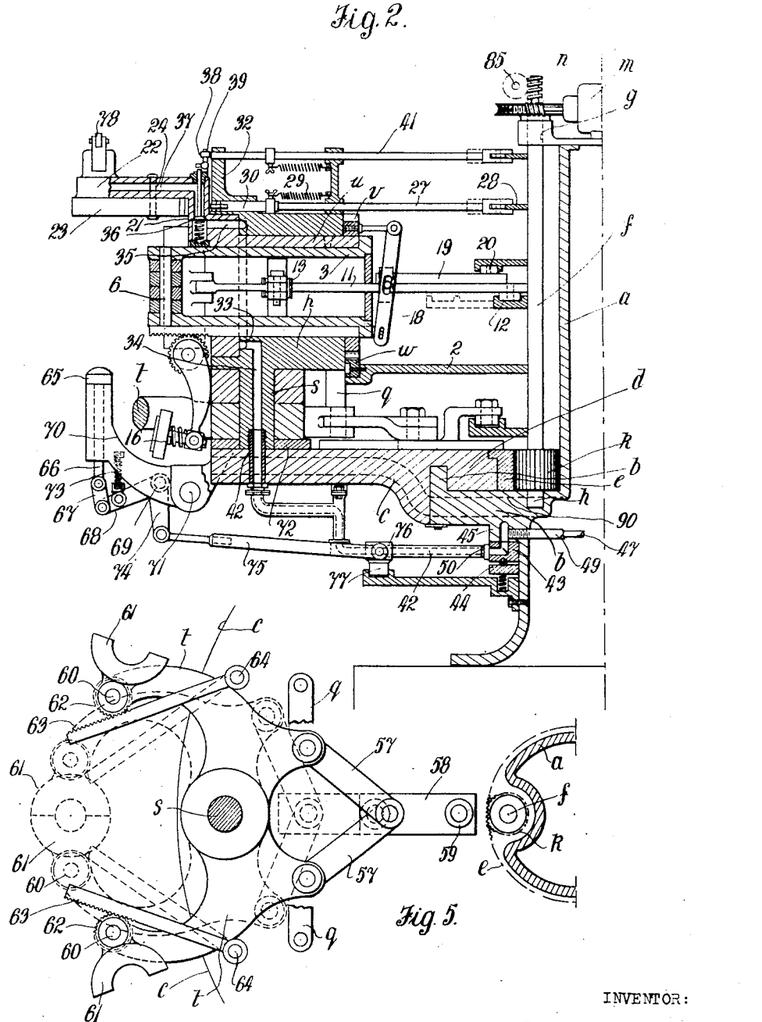
Fig. 5 is a similar view to Figs. 3 and 4, showing the halves of the finishing mould, together with their actuating mechanism, in two different positions.

By the foregoing means, when the halves of the mould are opened, they are not only separated but caused to be rotated upon their pivots 60 to give greater clearance for the movements of the parison mould.

Referring to the bottom mould or block 65 this is mounted at the end of a stem 66, connected by a link 67 to one arm 68 of a bell crank lever pivoted at 69 to a swinging bracket 70 provided with a guide for the stem 66. The bracket 70 is pivoted at 71 to an extension from a bearing plate 72. 73 is a compression spring tending to push the arm 68 away from the swinging bracket 70. The other arm 74 of the bell crank lever is pivoted to a rod 75, adjustable as to length, the other end of which is connected to a slide 76 carrying the cam roller 77 engaging in a grooved cam fixed to the central column $a$. The slide 76 works over and is guided by a portion of the pipe for air and vacuum 42.

Figure 6:
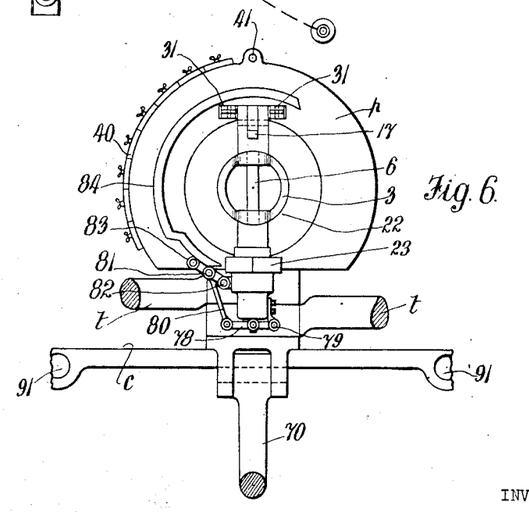
Fig. 6 is a front view of one of the units with parts removed.

With regard to the plug for making the preliminary blow opening, this is connected to a lever 78, pivoted at 79 to a bracket carried by the blowing head 22. The other end of this lever is connected by a link 80 to another lever 81 pivoted at 82 to a bracket at the side of the blowing head, and carrying a cam roller 83 working over a cam 84 carried on the face of the casting $p$, as shown at Fig. 6. Normally, the plug is held in the inserted position to cause the glass, flowing into the neck mould, to receive the impression of the end of the plug, ready for the preliminary blowing. As the head 22, carried by the sleeve $u$ is rotated, the roller 83 rides up the cam 84, and through the link and lever mechanism withdraws the plug, ready for the passage of the air.

In some cases where it is desired to provide a screw thread on the interior of the neck of the bottle, this may be formed by the plug, which in that case not only moves longitudinally but is provided with the requisite rotary motion. This may be effected in various ways, as for instance by providing in place of the cam, an arc shaped rack engaging a pinion, which, through skew gear, causes rotation of the plug in a suitable screwed nut for giving the longitudinal movement. The racks would be provided, one adapted to move the plug in one direction and the other in the opposite direction.

Figure 10:
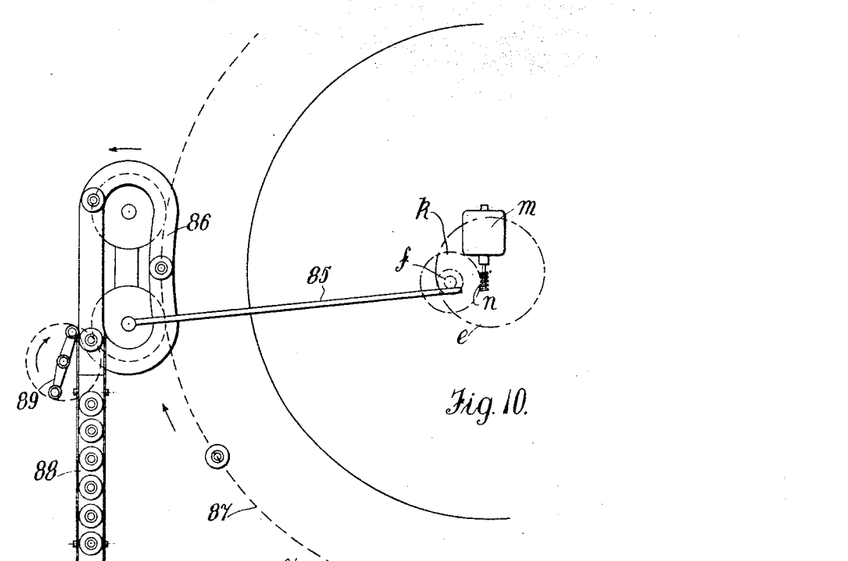
Fig. 10 is a diagrammatic plan illustrating the synchronous drive of the delivery conveyor.

Referring to the mechanism for the removal of the bottles; the vertical shaft $f$ drives an overhead shaft 85 through suitable gearing. This overhead shaft, also through suitable gearing drives a take off belt or carrier 86, which as shown in Fig. 10 comes beneath the path of travel 87 of the bottles hanging from the neck mould. The gearing between the shaft $f$ and the take off belt 86 is such that the speed of movement of the said belt is the same as and in the same direction as that of the bottles.

The bottles are transferred from the belt 86 to the conveyor 88 by means of transfer arms 89.

The air for cooling purposes passes up the central column a, through passages 90 in the casting and 91 in the table c to apertures, whence it is supplied by means of appropriate devices to the moulds and other parts which it is desired to cool.

The general operation of the machine, when fitted with the turn-over units which have been fully described, is as follows:—

The machine is rotated, preferably continuously, from the motor m through the shaft f and the pinion k meshing with the annulus e.

Figure 1:
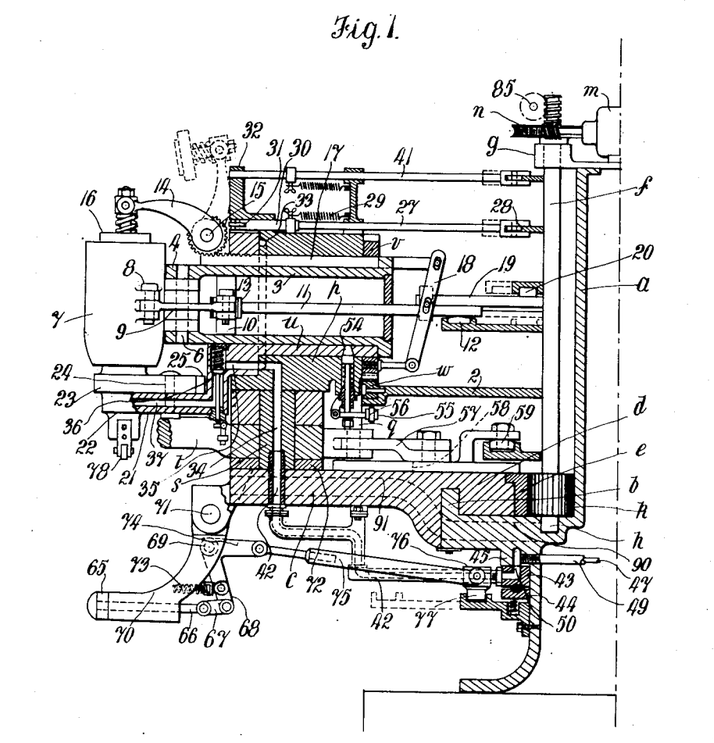
Figs. 1 and 2 are somewhat diagrammatic sectional elevations of one half of the machine, showing the parts in two different positions.

Considering the cycle of operations as commencing from the position of the parts shown at Fig. 1; it will be observed that the halves 7 of the parison mould are in the inverted and closed position, over and in register with the halves of the ring mould 23, which are also in the closed position. In this position moreover, the two halves 61 of the finishing mould are turned out of the way into the position shown in Fig. 5. The cover 16 Fig. 1, is at this time in the dotted position, so that the inverted opening of the parison mould is free.

While the mould is in this position, a charge or gob of molten glass is supplied thereto, in any suitable manner, but preferably from an automatic feed.

At the moment when the gob of glass enters the parison mould, the aperture 50 of the particular unit under consideration comes opposite the chamber 46 connected to the vacuum pipe 47, sucking down the molten glass and making it fill the neck or ring mould, which may in some cases be provided with additional suction openings to facilitate this operation.

As the unit passes away from this position, the cover 16 is applied to the bottom of the parison mould 7, and the catch 54 is withdrawn in the manner already described. The gear wheel v coming into engagement with a portion of the interrupted circular rack w causes the sleeves u and 3 to be rotated together until, after passing through 180° the gear wheel v becomes disengaged from the rack and the sleeves are locked in position by the bolt 54.

During the half rotation of the sleeves, the following operations have been taking place:—

In the first place the plug has been withdrawn, as previously explained, and then a preliminary blowing of the parison has taken place, through the roller 39 co-operating with the arm 40 and opening the valve 36—the aperture 50 in the ring 43 having by this time passed into communication with the chamber 48 in connection with the blowing air. The halves of the parison mould are next opened in the following manner. The rod 11 is moved inwards by its cam and causes the plunger 10 to move in the cylinder 3, causing the links g to open the halves of the mould 7 about the pivot 6. This position is shown in Fig. 3. Further inward movement of the rod 11 causes the inner sleeve 3 to be moved back with the halves of the parison mould, and the slots 52 to work over the pins 51, until they reach the ends of the slots. This position is shown at Fig. 4. The cover 16 is then removed from the bottom of the parison mould. When the mold is closed it occupies the dotted line position of Figure 3, and when the rod 11 is moved to the right in said figure by the engagement of the roller 12 in the cam path, the halves of the mold are moved to the full line position. This movement takes place independently of the sleeve 3. The full line position of Figure 3 corresponds to the dotted line position of Figure 4, from which position the mold and sleeve 3 are moved a little further to the full line position in Figure 4, this radial movement of the sleeve being limited by the pins 51.

The halves 61 of the finishing mould are now closed around the parison suspended from the ring mould, and the bottom block 65 is raised into position, it being observed that the final upward movement of the bottom block 65 is caused by a slight movement of the bell crank lever pivoted at 69 against the action of the spring 73. This applies to an ordinary bottle with a comparatively flat bottom, the case of a bottle having a so called "push up" bottom being dealt with in reference to Fig. 11.

Proceeding with the operation, the valve 36 is next opened by means of the rod 41, which is operated from its cam, and blowing is effected, it being remembered that the aperture 50 is still passing over the chamber 48, which is of considerable angular extent.

As the rotation of the machine proceeds, the bottle is retained in the finishing mould for a suitable period, the internal air pressure being still maintained. The halves of the finishing mould then commence to open, but the bottom block 65 is still maintained in the raised position, so that it serves the purpose of an extractor for preventing the bottle sticking to either half of the mould. On the continuation of the operation the bottom block 65 drops away and the finishing mould being now completely open the bottle remains suspended from the ring or neck mould. At this moment, it comes over the take off belt 86 and is delivered and removed as previously described, the ring mould being opened to release the bottle by a suitably timed movement of the rod 27. As the rotation of the machine proceeds, the neck mould is allowed to close, the halves of the parison mould are pushed outwards and closed, also holding the halves of the ring mould securely closed. The bolt 54 is released, the gear wheel v comes into engagement with another portion of the interrupted circular rack w and the sleeves u and 3 are rotated further through 180°, during which operation the plug is restored to its original position, the parts being finally locked in their original positions, as shown at Fig. 1, preparatory to the commencement of a fresh cycle of operations.

It will be understood, that the cycle of operations just described is taking place with respect to all the units on the rotating table, but that different units are in different phases of operation.

Figure 11:
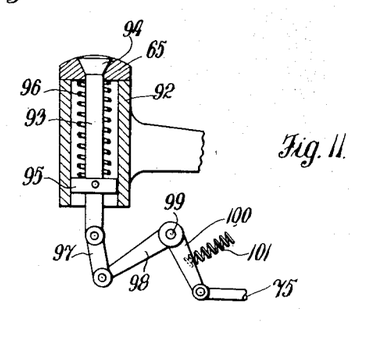
Fig. 11 is a detail of the improved construction in connection with the bottom mould or block.
Figure 12:
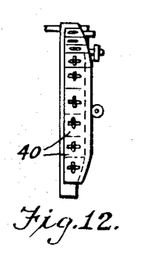
Figure 12 is a side view of a portion of Figure 6 showing the adjustable cams.

Referring now to Fig. 11, which illustrates a modified construction used for producing a bottle, with a so called "push up" bottom, in this instance the arm for carrying the bottom block is provided with a sleeve 92. The bottom block 65 which in this instance is formed as a ring, is adapted to rest on the top of this sleeve. 93 is a stem which is provided at the top with an enlargement 94, the upper surface of which is adapted to form a portion of the top of the block 65. 95 is a collar pinned to the stem 93 and between this collar and the underside of the ring like block 65 is a compression spring 96. The lower end of the stem 93 is connected by a link 97 to one arm 98 of a bell crank lever pivoted at 99, to a part moving with the arm carrying the sleeve 92 or an extension from said arm. The other arm 100 of the bell crank lever has interposed between it and the arm carrying the sleeve or the extension thereof a compression spring 101. 75 is the rod for the operation of the bottom block already referred to.

With this construction when the arm carrying the block rises into position, after it is stopped there is a further upward movement of the block as previously explained, and the lower edges of the halves of the mould register with the ring portion thereof and hold it firmly in position. After the glass is almost set and the push up portion at the bottom of the bottle is to be produced, this is effected from the cam through the mechanism by a further upward movement of the stem 93, which, as the ring portion 65 of the block cannot move upwards, owing to its engagement with the halves of the finishing mould, causes the enlarged portion 94 to be protruded, pushing up the bottom of the bottle to the required extent.

It may be observed that in conclusion that the particular constructions described may be varied largely in practice according to the nature of the work which the machine has to perform and the type of glassware to be manufactured.

What I claim and desire to secure by Letters Patent in the United States of America is:—

1. In a rotary machine, of the type described, for the manufacture of glass articles, the combination of a central stationary column, a table rotatable about such column, means for rotating the table, a plurality of mechanisms for making blown glass articles mounted radially upon the said table, each such mechanism including a casing which carries a divided finishing mould and operating parts thereof, an inner element rotatable therein and carrying a head, divided neck mould, divided parison mould and mechanisms for opening and closing the same, together with means for moving the halves of the parison mould radially with respect to the central standard and out of the way of the finishing moulds when the latter are to be closed, substantially as described.

2. In a rotary machine, of the type described, for the manufacture of glass articles, the combination of a central stationary column, a table rotatable about such column, means for rotating the table, a plurality of mechanisms for making blown glass articles mounted radially upon the said table, each such mechanism including a casing which carries a divided finishing mould and operating parts thereof and is provided with a radially extending bore, a sleeve rotatable in the said bore and carrying the blowing head and divided neck mould, an inner sleeve rotatable with and capable of limited longitudinal movement within the first mentioned outer sleeve and carrying the pivots for the halves of the parison mould, and an inner plunger longitudinally slidable within the inner sleeve and connected appropriately to the halves of the parison mould, all for the purposes set forth.

3. In a rotary machine of the type described, for the manufacture of glass articles, the combination of a central stationary column, a table rotatable about such column, means for rotating the table, a plurality of mechanisms for making blown glass articles mounted radially upon the said table, each such mechanism including a casing which carries a divided finishing mould and operating parts thereof, an inner element rotatable therein and carrying a blowing head, divided neck mould, divided parison mould and mechanisms for opening and closing the same, means for moving the halves of the parison mould radially with respect to the central standard and out of the way of the finishing moulds when the latter are to be closed, a plug for forming the preliminary blow opening, a cam on the fixed casing, lever mechanism co-operating with the said cam for withdrawing the plug and means for returning the plug to its initial position.

4. In a rotary machine of the type described for the manufacture of glass articles, the combination of a central stationary column, a table rotatable about such column, means for rotating the table, a plurality of mechanisms for making blown glass articles mounted radially upon the said table, each said mechanism including a casing which carries a divided finishing mould and operating parts thereof and is provided with a radially extending bore, a sleeve rotatable in the said bore and carrying the blowing head and divided neck mould, an inner sleeve rotatable with and capable of limited longitudinal movement within the first mentioned outer sleeve and carrying the pivots for the halves of the parison mould, and an inner plunger longitudinally slidable within the inner sleeve and connected by appropriate links to the halves of the parison mould, a circular toothed rack on the end of the first mentioned sleeve co-operating with an interrupted toothed wheel on the fixed framework for inverting and restoring to the upright position the said sleeve and the parts carried thereby, together with means for automatically locking and for unlocking the turnover portion in the upright and inverted positions of the parts.

5. In a rotary machine of the type described for the manufacture of glass articles, the combination of a central stationary column, a table rotatable about such column, means for rotating the table, a plurality of mechanisms for making blown glass articles mounted radially upon the said table, each such mechanism including a casing which carries a divided finishing mould and operating parts thereof and is provided with a radially extending bore, the end of said casing comprising a smooth annular surface provided with a circumferential groove in communication by means of a pipe with sources of suction and air pressure, a sleeve rotatable in the before mentioned bore and provided with a smooth end surface co-operating with the grooved surface at the end of the casing, the said sleeve carrying the blowing head connected through a suitable valve chamber with a pipe, the orifice of which corresponds with the before mentioned groove in all positions of the turnover mechanism, the said sleeve being also provided with a divided neck mould, an inner sleeve rotatable with and capable of limited longitudinal movement within the first mentioned outer sleeve and carrying the pivots for the halves of the parison mould, and an inner plunger longitudinally slidable within the inner sleeve and connected appropriately to the halves of the parison mould, all for the purposes set forth.

6. In a rotary machine of the type described for the manufacture of glass articles, the combination of a central stationary column, a table rotatable about said column, means for rotating the table, and a plurality of mechanism for making blown glass articles mounted radially upon said table; each of said mechanisms including a casing provided with a radially extending bore and a support for the casing, a divided finishing mold and operating parts therefor carried by the support of said casing, a sleeve rotatable in said bore, a blowing head, divided neck mold and divided parison mold and mechanism for opening and closing the same carried by said sleeve, said casing having a face provided with a circumferential groove and said sleeve having a face cooperating with the face on the casing and also having a passage which opens into registry with the circumferential groove in all positions of the sleeve and which also leads to the blowing head.

7. In a rotary machine of the class described for the manufacture of glass articles, the combination of a central stationary column, a table rotatable about said column, means for rotating the table, a plurality of mechanisms for making blown glass articles mounted radially upon said table, each of said mechanisms including a casing and a support therefor, a divided finishing mold and operating parts therefor carried by the support of the casing, said casing being provided with a smooth face having a circumferential groove, means for connecting said groove with sources of suction and air pressure, an inner element rotatable in the casing, a blowing head and valve chamber carried thereby, the inner element being provided with a face which cooperates with the face on the casing, and having a passage which connects the valve chamber and circumferential groove in all positions of the inner element, a valve in the valve chamber, a valve stem extending to the outside thereof, a lever cooperating with said valve stem and having an arm which travels over the surface of the casing during the turnover movement of the inner element, adjustable cam sections located on such surface and adapted to cooperate with the lever and open the valve, spring means for normally closing the valve, and a conduit connecting the valve chamber and blowing head.

8. A machine of the turnover type for the manufacture of blown glass articles including a central stationary column provided with a horizontal step having circumferentially extending chambers in communication with sources of vacuum and air pressure, a distributor ring rotatable beneath the said step, spring means for pressing the co-operating surfaces together and openings in the rotatable ring connected to pipes for supplying air under pressure or exerting suction, such openings being adapted to co-operate with the circumferentially extending chambers in the fixed step.

9. In a machine of the turnover type for the manufacture of blown glass articles, the combination of a central stationary column, a table rotatable about such column, means for rotating the table, a plurality of mechanisms for making blown glass articles mounted radially upon the said table, each such mechanism including a casing which carries a divided finishing mould and operating parts thereof, an inner element rotatable therein and carrying a head, divided neck mould, divided parison mould and mechanism for opening and closing the same, means for moving the halves of the parison mould radially with respect to the central standard and out of the way of the finishing moulds when the latter are to be closed, a cover adapted to be applied to the bottom of the parison mould and automatic means for applying the cover after the mould has been charged and before it is inverted and for removing it after inversion, substantially as described.

10. In a rotary machine of the type described for the manufacture of glass articles, the combination of a central stationary column, a table rotatable about such column, means for rotating the table, a plurality of mechanisms for making blown glass articles mounted radially upon the said table, each such mechanism including a casing which carries a divided finishing mould and operating parts thereof, an inner element rotatable therein and carrying a head, divided neck mould, divided parison mould and mechanisms for opening and closing the same, means for moving the halves of the parison mould radially with respect to the central standard and out of the way of the finishing moulds when the latter are to be closed, a bottom block adapted to fit at the bottom of the finishing mould and means for applying the said block and for retaining it in position after the opening of the halves of the finishing mould, substantially as and for the purposes set forth.

11. In a rotary machine of the type described for the manufacture of glass articles, the combination of a central stationary column, a table rotatable about such column, means for rotating the table, a plurality of mechanisms for making blown glass articles mounted radially upon the said table, each such mechanism including a casing which has mounted in connection therewith a pivot carrying bearer arms for the halves of the finishing mould, secondary pivots on the said arms each carrying one half of the finishing mould, pinions in connection with such secondary pivots and racks co-operating with said pinions and adapted to oscillate the halves of the mould into and out of the operative position, an inner element rotatable in the fixed casing and carrying a head, divided neck mould, divided parison mould and mechanisms for opening and closing the same, together with means for moving the halves of the parison mould radially with respect to the central standard and out of the way of the finishing moulds when the latter are to be closed, substantially as described.

In testimony whereof I have hereunto subscribed my name.

ROBERT FREDERICK HALL.